United States Patent
Kwon et al.

(10) Patent No.: US 8,759,454 B2
(45) Date of Patent: Jun. 24, 2014

(54) LOW FRICTION POLYMERIC COMPOSITIONS AS WELL AS DEVICES AND DEVICE FABRICATION METHODS BASED THEREON

(71) Applicant: Innovia LLC, Miami, FL (US)

(72) Inventors: Yongmoon M. Kwon, Weston, FL (US); Leonard Pinchuk, Miami, FL (US)

(73) Assignee: Innovia LLC, Miami, FL (US)

( * ) Notice: Subject to any disclaimer, the term of this patent is extended or adjusted under 35 U.S.C. 154(b) by 0 days.

(21) Appl. No.: 13/863,549

(22) Filed: Apr. 16, 2013

(65) Prior Publication Data

US 2013/0274423 A1    Oct. 17, 2013

Related U.S. Application Data

(60) Provisional application No. 61/625,182, filed on Apr. 17, 2012.

(51) Int. Cl.
*C08L 75/04* (2006.01)
*C08L 75/06* (2006.01)
*C09D 175/04* (2006.01)

(52) U.S. Cl.
USPC ........... 525/418; 525/457; 427/340; 427/353; 427/2.3; 427/2.31

(58) Field of Classification Search
USPC ........... 525/457, 418; 427/340, 353, 2.3, 2.31
See application file for complete search history.

(56) References Cited

U.S. PATENT DOCUMENTS

| | | | |
|---|---|---|---|
| 4,523,005 A | 6/1985 | Szycher | |
| 4,642,267 A | 2/1987 | Creasy et al. | |
| 5,229,431 A | 7/1993 | Pinchuk | |
| 5,272,012 A | 12/1993 | Opolski | |
| 7,087,078 B2 | 8/2006 | Hildebrand et al. | |
| 2003/0224150 A1 | 12/2003 | Ludwig et al. | |
| 2003/0232933 A1 | 12/2003 | Lagneaux et al. | |
| 2004/0058082 A1* | 3/2004 | Schachter et al. | 427/405 |
| 2004/0224001 A1* | 11/2004 | Pacetti et al. | 424/423 |
| 2005/0054774 A1 | 3/2005 | Kangas | |
| 2005/0100609 A1* | 5/2005 | Claude | 424/486 |
| 2006/0189756 A1* | 8/2006 | Nelson et al. | 525/92 R |
| 2006/0240060 A1 | 10/2006 | Bavaro | |
| 2007/0014945 A1 | 1/2007 | Lin et al. | |
| 2008/0003259 A1 | 1/2008 | Salamone et al. | |
| 2008/0318022 A1* | 12/2008 | James et al. | 428/304.4 |
| 2009/0157047 A1 | 6/2009 | Lin et al. | |
| 2010/0048758 A1 | 2/2010 | Chen et al. | |

FOREIGN PATENT DOCUMENTS

WO    WO2008104572 A2    9/2008

OTHER PUBLICATIONS

Hoare et al. (Hydrogels in drug delivery: Progress and challenges, Polymer, 49, 1993-2007 Apr. 2008).*
Lubrizol Medical and Health Care Engineered Solutions, Mar. 2011, p. 1-7.*
Lubrizol's Engineered Polymers for Medical & HealthCare, The Lubrizol Corporation, 2011.
Carbothane® TPU—Clear, Technical Data Sheet, Lubrizol Engineered Polymers Medical & Health Care, 2011.
Pellethane® 2363-80A TPU, Technical Data Sheet, Lubrizol's Medical & HealthCare Engineered Solutions, Feb. 2011.
Sancure® 1073C Aliphatic Waterborne Urethane Polymer, Technical Data Sheet, Lubrizol, Jun. 4, 2007.
Tecoflex® TPU—Clear, Technical Data Sheet, Lubrizol's Medical & HealthCare Engineered Solutions, Feb. 2011.
Tecophilic® Hydrogel, Technical Data Sheet, Lubrizol's Medical & HealthCare Engineered Solutions, Feb. 2011.
Tecothane® TPU Clear, Technical Data Sheet, Lubrizol Engineered Polymers Medical & Health Care, Oct. 2011.

* cited by examiner

*Primary Examiner* — Randy Gulakowski
*Assistant Examiner* — Christopher M Rodd
(74) *Attorney, Agent, or Firm* — Gordon & Jacobson, PC

(57) ABSTRACT

A polymer blend is provided that includes a polycarbonate polyurethane polymer component having a water contact angle greater than 75 degrees and a polyurethane polymer component having a water contact angle less than 75 degrees. The polycarbonate polyurethane component and the other polyurethane polymer can be immiscible with respect to one another, and thus are phase separated in the polymer blend. The weight percentage of the polycarbonate polyurethane polymer component is greater than the weight percentage of the other polyurethane polymer component in the blend. The polymer blend is well suited for realizing a low friction surface of a variety of medical and non-medical devices.

25 Claims, 1 Drawing Sheet

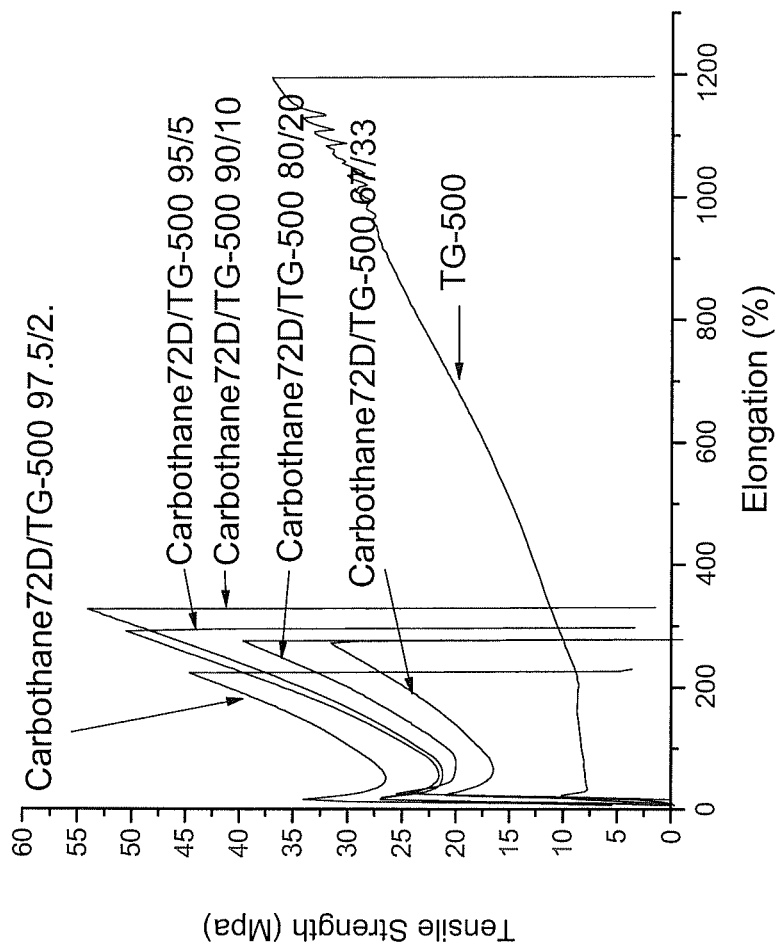

LOW FRICTION POLYMERIC COMPOSITIONS AS WELL AS DEVICES AND DEVICE FABRICATION METHODS BASED THEREON

CROSS-REFERENCE TO RELATED APPLICATIONS

The present application claims priority from U.S. Provisional Patent Appl. No, 61/625,182, entitled "LOW FRICTION POLYMERIC COMPOSITIONS AS WELL AS DEVICES AND DEVICE FABRICATION METHODS BASED THEREON," filed on Apr. 17, 2012, herein incorporated by reference in its entirety.

BACKGROUND

1. Field

The present application relates to low friction polymeric materials for surfaces of devices, particularly medical devices and non-medical devices.

2. Related Art

Various medical devices (such as catheters, guide wires and the like) employ hydrophilic coatings to reduce friction when maneuvering these devices through blood vessels. Typically, the hydrophilic coating is applied in a four step process. In the first step, the device is fabricated (such as by extruding or compression molding the device). In the second step, a primer coat of isocyanate or isocyanate/prepolymer is applied to the device. In the third step, the hydrophilic coating (typically containing polyvinyl pyrrolidone or polyethylene oxide) is applied to the primer coat. In the fourth step, the system is cured.

Hydrophilic polyurethane coatings have been used to decrease the surface friction on medical devices. U.S. Pat. Publ. No. 2007/0014945 discloses that a certain hydrophilic polyurethane (i.e., Tecogel, which was formerly manufactured by Thermedics and now by Lubrizol under the Tecophilic® brand) can be coated on a medical devices, such as intravascular guidewires, catheters, and stents using dip coating and spray coating means. U.S. Pat. Publ. No. 2010/0048758 discloses the use of a hydrophilic coating realized by dipping or spraying the device in a solution mixture of TG-500 (which is manufactured by Lubrizol, Wilmington, Mass. and sold under the Tecophilic® brand), 1-methyl-2-pyrrolidinone and Sancure® 1073C (manufactured by Lubrizol, Cleveland, Ohio), followed by drying at 130° C. for five minutes. The Tecophilic® brand of products are hydrophilic aliphatic polyether urethanes which absorb water ranging from 20 to 1000% of their dry weight at equilibrium. TG-500 is one of the Tecophilic® polyurethanes. Sancure® 1073 is an aliphatic polyurethane that is hydrophobic in nature. Polyethylene oxide has also been used to prevent thrombus formation on surfaces and there are a large number of publications to this effect.

U.S. Pat. No. 4,642,267 describes a low friction hydrophilic polymer for medical devices that employs a blend of thermoplastic polyurethane and poly (N-vinyl lactam).

SUMMARY

The present application encompasses a polymer composition that has improved low friction characteristics (lubricity), particularly when wet.

The present application further encompasses a polymer composition that can be processed to form a variety of shapes and parts.

The present application further encompasses devices, particularly medical devices, with at least one surface formed from such a polymer composition.

The present application includes a polymer blend that is embodied by a polycarbonate polyurethane polymer component having a water contact angle greater than 75 degrees and a polyurethane polymer component having a water contact angle less than 75 degrees. The polycarbonate polyurethane polymer component and the other polyurethane polymer component can be immiscible with respect to one another, and thus are phase separated in the polymer blend. The weight percentage of the polycarbonate polyurethane polymer is component greater than the weight percentage of the other polyurethane polymer component in the blend. The polymer blend is useful for realizing low friction surfaces of a variety of medical and non-medical devices.

BRIEF DESCRIPTION OF THE DRAWINGS

FIG. 1 is a stress-strain curve for the polymer blends of examples 3 to 8 of Table 1.

DETAILED DESCRIPTION OF THE PREFERRED EMBODIMENTS

Hydrophilicity refers to a physical property of a material that can transiently bond with water ($H_2O$) through hydrogen bonding. A hydrophilic material is a friend of water and attracts water to some degree. Hydrophobicity refers to the physical property of a material that repels a mass of water. A hydrophobic material repels water to some degree. The evaluation of hydrophilicity and hydrophobicity is made through water contact angle measurements employing the sessile drop method by a contact angle goniometer in accordance with ASTM D7334. For the purposes of this application, a hydrophilic polymer material refers to a polymer material with a water contact angle less than 75 degrees, and a hydrophobic polymer material refers to a polymer material with a water contact angle greater than 75 degrees.

Generally known polyurethanes include those specified in U.S. Pat. Nos. 4,739,013 and 4,810,749, the subject matter thereof being incorporated by reference hereinto. The term polyurethane encompasses a family of polymers that are usually formed from three principle components. These are: a polyol, a diisocyanate and a chain extender. They are generally classified as polyurethanes inasmuch as the backbone thereof includes urethane groups, which groups are recurring units within the polymer backbone. The urethane group is produced by reacting an isocyanate group (N=C=O) of the diisocyanate component with a hydroxyl (alcohol) group (—OH) of the polyol component. The urethane group is characterized by:

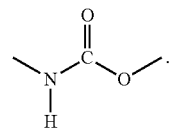

A further linkage site reacts another terminal isocyanate group (N=C=O) of the diisocyanate component with a terminal hydroxyl (or amine) group of the chain extender. Polyurethanes are typically produced by the polyaddition reaction of the diisocyanate component with the polyol component in the presence of a catalyst and other additives. The diisocyanate is a molecule with two or more isocyanate functional groups (i.e., R—(N=C=O)n≥2). The polyol is a molecule with two or more hydroxyl functional groups (i.e., R'—(OH) n≥2). The reaction product is a polymer containing recurring units of the urethane group within its backbone. Isocyanates will react with any molecule that contains an active hydrogen atom. Importantly, isocyanates can react with a diamine to from a urea linkage, rather than a urethane linkage. The reaction product can be called a polyurea but is typically referred to as polyurethane. It can be appreciated that polyurethane can also be synthesized with a polyol and isocyanate only; however, typical urethanes that are commercially available include a chain extender.

The polymerization typically will be carried out in the presence of a suitable solvent and under appropriate reaction conditions, although non-solvent reactions could be carried out if the polymer is to be formed into pellets or the like for other extrusion and/or molding procedures, or is to be made into foams.

Polyols are higher molecular weight materials manufactured from an initiator and monomer building blocks. With particular reference to the polyol component of polyurethanes, there are three families of polyols that are generally used commercially. These are the polyester polyols, the polyether polyols and the polycarbonate polyols. Also available are a family of polyols that are amine terminated rather than hydroxyl terminated.

Polycarbonate polyols have a recurring carbonate ester group characterized by

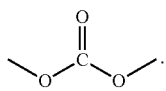

Typical examples of polycarbonate polyols include the reaction products of 1,6-hexanediol with ethylene carbonate, 1,4-butanediol with propylene carbonate, 1,5-pentanediol with ethylene carbonate, cyclohexanedimethanol with ethylene carbonate and the like and mixtures of the above such as diethyleneglycol and cyclohexanedimethanol with ethylene carbonate. When desired, polycarbonates such as these can be copolymerized with components such as hindered polyesters, for example phthalic acid, in order to form carbonate/ester copolymer polyols. Copolymers formed in this manner can be entirely aliphatic, entirely aromatic, or mixed aliphatic and aromatic. The polycarbonate polyol typically has a molecular weight of between about 200 and about 4000 Daltons. A polyurethane reacted from a polycarbonate polyol is referred to herein as a polycarbonate polyurethane.

The diisocyanate of the polyurethane typically has the general structure OCN—R'—NCO, wherein R' is a hydrocarbon that may include aromatic or non-aromatic structures, including aliphatic and cycloaliphatic structures. Exemplary diisocyanates include methylene diisocyanate (MDI); 4,4-methylene bisphenyl isocyanate; 4,4'-diphenylmethane diisocyanate and hydrogenated methylene diisocyanate (HMDI). Other exemplary diisocyanates include hexamethylene diisocyanate and the toluene diisocyanates such as 2,4-toluene diisocyanate and 2,6-toluene diisocyanate, 4,4' tolidine diisocyanate, m-phenylene diisocyanate, 4-chloro-1,3-phenylene diisocyanate, 4,4-tetramethylene diisocyanate, 1,6-hexamethylene diisocyanate, 1,10-decamethylene diisocyanate, 1,4-cyclohexylene diisocyanate, 4,4'-methylene bis(cyclohexylisocyanate), 1,4-isophorone diisocyanate, 3,3'-dimethyl-4,4'-diphenylmethane diisocyanate, 1,5-tetrahydronaphthalene diisocyanate, and mixtures of such diisocyanates.

The chain extender of the polyurethane is a low molecular weight hydroxyl (or amine) terminated compound that plays an important role in the morphology of polyurethane polymer. Well-known chain extenders are ethylene glycol, 1,4-butanediol (1,4-BDO or BDO), 1,6-hexanediol, cyclohexane dimethanol and hydroquinone bis(2-hydroxyethyl)ether (HQEE). Generally speaking, most diols or diamines (including the ethylenediols, the propylenediols, ethylenediamine) can be used as a chain extender of the polyurethane.

Catalysts can be used in the polymerization reaction of the polyurethane. These catalysts can generally be classified into two broad categories, amine compounds and organometallic complexes.

Polyurethanes can be reacted in a single-stage reactant charge, or they can be reacted in multiple stages. Other components, such as antioxidants, extrusion agents, fillers (such as radiopaque fillers), dyes, pigments, fragrances and the like can be included. Additionally, the polyurethane can be polymerized in a suitable solvent, typically polar organic solvents such as dimethylacetamide, dimethylformamide, dimethylsulfoxide toluene, xylene, m-pyrrol, tetrahydrofuran, cyclohexanone, 2-pyrrolidone, and the like, or combinations thereof. Polyurethanes can be prepared in a solid form (such as pellet or film), a dispersion, a foam or other suitable product.

It was found, surprisingly enough, that a polymer blend including a hydrophobic polycarbonate polyurethane polymer component and a hydrophilic polyurethane polymer component is well suited for realizing a low friction surface of a device. The hydrophobic polycarbonate polyurethane polymer component and the hydrophilic polyurethane polymer component are immiscible with respect to one another, and thus are phase separated in the polymer blend. The hydrophobic polycarbonate polyurethane polymer component is the major component of the polymer blend, and the hydrophilic polyurethane polymer component is a minor component of the polymer blend. Thus, the weight percentage of the hydrophobic polycarbonate polyurethane polymer component is greater than the weight percentage of the hydrophilic polyurethane polymer component in the blend. The hydrophobic polycarbonate polyurethane component of the polymer blend preferably has a water contact angle of at least 80 degrees. The hydrophilic polyurethane polymer component of the blend has a water contact angle less than the water contact angle of the hydrophobic polycarbonate polyurethane polymer component. In one example, the hydrophilic polyurethane polymer component of the blend can have a water contact angle in a range of 65 degrees to 70 degrees. It is also preferred that the hydrophilic polyurethane polymer component of the blend have the capability of absorbing and retaining an amount of water that is at least 300% of its dry weight (more preferably, at least 500% of its dry weight).

The polymer blend can be formed employing conventional melt blending techniques and apparatus (e.g., a two-roll heated mill, helical screw extruder, a Brabender mixer, etc.) that blends together pellets (or other solid forms) of the hydrophobic polyurethane polymer component and the hydrophilic polyurethane polymer component. Other components, such as compatibilization agent, extrusion agents, fillers (such as radiopaque fillers), therapeutic agents, dyes and pigments and the like can be added to the blend. Alternatively, pellets (or other solid forms) of the hydrophilic polyurethane polymer component and the hydrophobic polyurethane polymer component can be combined by dissolving them in a solvent which is subsequently evaporated to yield the blend. The hydrophobic polycarbonate polyurethane polymer component and the hydrophilic polyurethane polymer component are immiscible with respect to one another, and thus are phase separated in the polymer blend.

In one embodiment, the hydrophobic polycarbonate polyurethane component is 50-95% by weight of the polymer blend. The relative weight concentration of the hydrophobic polycarbonate polyurethane polymer component to the hydrophilic polyurethane polymer component of the polymer blend is preferably at least 3:1. The hydrophobic polycarbonate polyurethane component preferably has a Shore hardness greater than 73A (most preferably a Shore hardness between 65D and 90D). Shore hardness is measured with an apparatus known as a durometer. The ASTM test method for measuring Shore hardness is described in ASTM D2240-00.

An exemplary polycarbonate polyurethane polymer component for the polymer blend can be selected from the Carbothane® family of polycarbonate polyurethanes, which are products of Lubrizol of Cleveland, Ohio. More specifically, PC-3572D is one of the Carbothane® polycarbonate polyurethanes and has a water contact angle on the order of 83 degrees and a Shore hardness of 67D to 72D when dry. In another example, PC-3585A is one of the Carbothane® polycarbonate polyurethanes and has a water contact angle of 82° and a Shore hardness of 70A to 85A when dry.

An exemplary hydrophilic polyurethane polymer component for the polymer blend can be selected from the Tecophilic® family of polyurethanes derived from a polyether polyol that is manufactured by Lubrizol. More specifically, TG-500 is one of the Tecophilic® polyurethanes and has a water contact angle in a range of 65 degrees to 70 degrees and a Shore hardness on the order of 45D to 60D when dry. It also has the capability of absorbing and retaining an amount of water that is 500% of its dry weight. The inventors used nuclear magnetic resonance (NMR) spectroscopy to determine that TG-500 is composed of polyethylene oxide, which imparts anti-thrombogenicity to the polymer blend and thus minimizes the tendency of the material in contact with the blood to produce a thrombus, or clot. This characteristic is useful for applications of the polymer blend in vascular medical devices as described herein. In another example, TG-2000 is one of the Tecophilic® polyurethanes and has a water contact angle in a range of 65 degrees to 70 degrees and a Shore hardness on the order of 45D to 60D the capability of absorbing and retaining an amount of water that is 900% of its dry weight. For applications requiring dimensional stability, the relative amount of the hydrophilic polyurethane component of the blend is selected to avoid excessive water absorption that can swell the device and cause dimensional instability.

The surface of a medical device realized from the polymer blend has reduced surface friction (particularly when wet). Hydration of the surface followed by dehydration of the surface can further reduce the surface friction (particularly when wet) and lowers the water contact angle of the surface (indicating improved hydrophilicity of the surface). For example, in examples 3 to 8 below, the polymer blends were hydrated in water at 75° C. for more than an hour and then dehydrated under vacuum at 100° C. for more than an hour. The hydration and dehydration process reduces the surface friction (particularly when wet) and lowers the water contact angle (indicating improved hydrophilicity of the surface). The hydration and dehydration process can be repeated for one or more additional times, if desired.

The polymer blend is suitable for low friction surfaces of a wide variety of medical devices. For example, a number of medical devices (such as guidewires, catheters, endoscopic devices, laparoscopic device, stents or stent-associated devices, embolic protection devices and the like) are designed to function in the vasculature. It is desirable that surfaces of these devices have a low friction or slippery feel in order to improve device handling, exchanges and steerability. For these devices, the surface can be coated (or otherwise formed) with the low friction polymer blend to provide these benefits.

It can be appreciated that the low friction polymer blend can be used in other medical devices, such as sutures, devices for inserting implants into the body (such as an inserter for an intraocular lens or an inserter for a breast implant), trocars and trocar valves, ports for laparoscopic surgery (such as single incision laparoscopic surgery (SILS) ports), ear tubes, speculum, condoms, intrauterine devices, contraceptive diaphragms, and joint articulating surfaces, and the like.

The hardness of the polycarbonate urethane component of the blend contributes to the hardness of the blend. Thus, the polycarbonate polyurethane component can be selected with the appropriate application. For example, a polycarbonate polyurethane with a hardness of approximately 75D can be selected for an application where a hard material is desired (such as an inserter device for holding an intraocular lens for insertion into the eye), while a polycarbonate polyurethane with a hardness of approximately 80A can be selected for an application where a relatively softer material is desired (such as for a catheter body).

It can be appreciated that the low friction polymer blend can be used in non-medical devices such as water slides, water skis, boat hulls, surf boards, flippers, water-repelling windshield coating (requires the polymer to be transparent and possibly made into an aerosol), competitive swimsuit coating, wetsuit coating, and a coating for inner surface of clothing (e.g., stay-dry shirt to avoid visible armpit sweat).

The polymer blend can be extruded in a solid form (e.g., pellets) for subsequent processing (e.g., molding or other form making process) into a sheet, a film, tube or other part of the respective device. The polymer blend can also be a coating that is applied to a surface of the device. In this case, the polymer blend (or the hydrophobic polycarbonate polyurethane polymer and the hydrophilic polyurethane polymer components of the blend) is dissolved in a solvent and the blend/solvent mixture is applied to a surface of the device. The solvent is subsequently evaporated to yield the coating on the surface of the device. The application of the blend/solvent mixture can involve spraying, dip coating, wet processing and other suitable coating processes. Other components, such as fillers (such as radiopaque fillers), dyes and pigments and the like can be added to the blend. For example, therapeutic agents (such as antimicrobial agents or antithrombotic agents) can be incorporated into the polymer blend. The device can employ a variety of materials, including metals, polymers, and woven and non-woven webs of natural and synthetic fibers.

The following examples are further illustrative of the polymer blends of the invention.

EXAMPLES 1-8

The following examples demonstrate the preparation of a reduced friction surface of a polymer blend formed by melt blending PC-3572D and TG-500. Prior to blending, all the components are dried in a vacuum oven at 80° C. for at least one hour. The dried PC-3572D and TG-500 were added to a Brabender mixer at their respective weight ratios (67/33, 80/20, 90/10, 95/5, 97.5/2.5 (w/w) for samples 3 to 8) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 1 to 8 when dry (i.e., without any hydration/dehydration). Water absorption was measured after a hydration time of sixteen hours at 60° C. The polymer blend sheets of examples 3 to 8 were hydrated in water at 75° C. for more than an hour and then dehydrated under vacuum at 100° C. for more than an hour. The water contact angle was measured for the polymer blend sheets of examples 3 to 8 after the hydration and dehydration process. The lubricity of the sheets was evaluated when wet, and the opaqueness of the sheets was evaluated visually when the sheets were dehydrated.

Table 1 summarizes the hardness, water absorption and water contact angle of the exemplary polymer blend sheets of PC-3572D and TG-500. The results demonstrate that the polymer blend sheets absorbed more water and the water contact angle of the dry polymer blend sheets decreased as the weight percentage of TG-500 increased. The results also show that the water contact angle of the polymer blend sheets after the hydration and dehydration procedure decreased as the weight percentage of TG-500 increased. The resultant polymeric blend sheets of examples 6, 7 and 8 are notably slippery where the PC-3572D is 67-90% by weight of the polymer blend, and the TG-500 content is 10% or more by weight of the blend. The high lubricities of the resultant polymeric blend sheets of examples 6, 7 and 8 are most likely due to incompatibility of the phases of the two components in the blend, which causes the hydrophilic polyurethane component to migrate to the surface of the sheet.

FIG. 1 represents stress-strain curves of the sheets realized from a PC-3572D and TG-500 as described above with respect to the examples 3 to 8 of Table 1. The blends show yielding points at 10% elongation. The tensile strength at the yielding points decreased as the weight percentage of TG-500 increased.

EXAMPLES 9-11

The following examples demonstrate the preparation of a reduced friction surface of a polymer blend formed by melt blending PC-3585A and TG-500. Prior to blending, all the components are dried in a vacuum oven at 80° C. for at least one hour. The dried PC-3585A and TG-500 were added to a Brabender mixer at their respective weight ratios (90/10, 80/20, 67/33 (w/w) for samples 9 to 11) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 9 to 11 when dry (i.e., without any hydration/dehydration). The lubricity of the polymer blend sheets (examples 9 to 11) was evaluated when wet, and the opaqueness of the sheets was evaluated visually when the sheets were dehydrated Table 2 summarizes the water contact angle of the exemplary polymer blend sheets of PC-3585A and TG-500 when dry (i.e., without any hydration/dehydration). The results demonstrate that the water contact angle of the dry polymer blend sheets decreased as the weight percentage of TG-500 increased. The resultant polymeric blend sheet of example 11 is slippery when wet where the PC-3585A is 67% by weight of the polymer blend, and the TG-500 content is 33% by

TABLE 1

Properties of the polymer blends of PC-3572D and TG-500

| Example | Polymer Blend | Hardness dry | Hardness hydrated | Water Absorption for 16 hrs (%) | Contact angle of water (°) Dry | Contact angle of water (°) Hydrated/ dehydrated | After compression molding |
|---|---|---|---|---|---|---|---|
| #1 | PC-3572D (100%) | 67D | — | — | 83 | — | — |
| #2 | PC-3572D (100%, Brabender processed) | 67D | — | — | 83 | — | — |
| #3 | TG-500 | 45D | 25A | — | 70 | — | — |
| #4 | PC-3572D (97.5%)/ TG-500(2.5%) | 65D | 50D | 4.6 | 82 | 77 | Not slippery when wet Transparent |
| #5 | PC-3572D (95%)/ TG-500(5%) | 65D | 50D | 6.1 | 80 | 62 | A little slippery when wet Transparent, |
| #6 | PC-3572D (90%)/ TG-500(10%) | 65D | 43D | 11.2 | 63 | 51 | Slippery when wet, slightly opaque |
| #7 | PC-3572D (80%)/ TG-500(20%) | 63D | 40D | 29.7 | 59 | 56 | Slippery when wet, slightly opaque. |
| #8 | PC-3572D (67%)/ TG-500(33%) | 65D | 45D | 100.3 | 51 | 41 | Slippery when wet, Slightly opaque. | weight of the blend. Note that the polymer blend sheets of PC-3585A and TG-500 of examples 9, 10 and 11 of Table 2 provide reduced lubricity as compared to the comparable polymer blend sheets of PC-3572D and TG-500 of examples 6, 7 and 8 of Table 1. Such reduced lubricity is likely due to the different hardness of the PC-3572D and PC-3585A. In addition, the hard segment of PC-3572D may render the blend of PC-3572D/TG-500 more homogeneously dispersed morphology than the blend of PC-3585A/TG-500. Note that the slight opaqueness of the sheet of example 11 indicates immiscibility of the PC-3585A/TG-500, while the transparent appearance of the sheet of example 15 of Table 3 indicates good miscibility of the TT-1075D/TG-500. Even though the sheets of examples 11 and 15 show similar water contact angles, the sheet of example 15 of Table 3 feels more slippery, which is likely due to the harder surface of the blend.

TABLE 2

Properties of the polymer blends of PC-3585A and TG-500

| Example | Polymer Blend | After compression molding | Contact angle of water (°) - dry |
|---|---|---|---|
| #9 | PC-3585A(90%)/ TG-500(10%) | Slightly slippery when wet. Slightly opaque. | 83 |
| #10 | PC-3585A (80%)/ TG-500(20%) | Slightly slippery when wet. Slightly opaque. | 77 |
| #11 | PC-3585A (67%)/ TG-500(33%) | Slippery when wet. Slightly opaque. | 72 |

OTHER EXAMPLES 12-15

The following examples demonstrate the preparation of a surface of a polymer blend formed by melt blending TT-1075D and TG-500. TT-1075D is a hydrophobic polyurethane of the Tecothane® family of polyurethanes, which are derived from a polyether polyol and manufactured by Lubrizol of Cleveland, Ohio. Prior to blending, all the components are dried in a vacuum oven at 80° C. for at least one hour. The dried TT-1075D and TG-500 were added to a Brabender mixer at their respective weight ratios (90/10, 80/20, 67/33 (w/w) for samples 12 to 15) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 12 to 15 when dry (i.e., without any hydration/dehydration). The lubricity of the polymer blend sheets (examples 12 to 15) was evaluated when wet, and the opaqueness of the sheets was evaluated visually when the sheets were dehydrated.

Table 3 summarizes the water contact angle of the exemplary polymer blend sheets of TT-1075D and TG-500 when dry (i.e., without any hydration/dehydration). The results demonstrate that the water contact angle of the dry polymer blend sheets decreased as the weight percentage of TG-500 increased. The resultant polymeric blend sheets of examples 13, 14 of table 3 exhibited minimal reduced friction characteristics. The polymeric blend sheet of example 15 of table 3 exhibited some improved reduced friction characteristics. Note that the slight opaqueness of the sheet of example 11 of Table 2 indicates immiscibility of the PC-3585A/TG-500, while the transparent appearance of the sheet of example 15 of Table 3 indicates good miscibility of the TT-1075D/TG-500. Even though the sheets of examples 11 and 15 show similar water contact angles, the sheet of example 15 of Table 3 feels more slippery, which is likely due to the harder surface of the blend.

TABLE 3

Surface property of the polymeric blend of TT-1075D and TG-500.

| Example | Polymer Blend | After compression molding | Contact angle of water (°) - dry |
|---|---|---|---|
| #12 | TT-1075D (100%) | | 83 |
| #13 | TT-1075D(90%)/ TG-500(10%) | Not slippery when wet. Transparent. | 79 |
| #14 | TT-1075D (80%)/ TG-500(20%) | Not slippery when wet. Transparent. | 79 |
| #15 | TT-1075D (67%)/ TG-500(33%) | Slippery when wet. Transparent. | 71 |

OTHER EXAMPLES 16-18

The following examples demonstrate the preparation of a surface of a polymer blend formed by melt blending 2363-80AE and TG-500. 2363-80AE is a hydrophobic polyurethane of the Pellethane® family of polyurethanes, which are derived from a polytetramethylene glycol and manufactured by Lubrizol of Cleveland, Ohio. Prior to blending, all the components are dried in a vacuum oven at 80° C. for at least one hour. The dried 2363-80AE and TG-500 were added to a Brabender mixer at their respective weight ratios (90/10, 80/20, 67/33 (w/w) for samples 16 to 18) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 16 to 18 when dry (i.e., without any hydration/dehydration). The lubricity of the polymer blend sheets (examples 16 to 18) was evaluated when wet, and the opaqueness of the sheets was evaluated visually when the sheets were dehydrated.

Table 4 summarizes the water contact angle of the exemplary polymer blend sheets of 2363-80AE and TG-500 when dry (i.e., without any hydration/dehydration). The results demonstrate that the water contact angle of the dry polymer blend sheets decreased as the weight percentage of TG-500 increased. The resultant polymeric blend sheets of examples 16, 17 and 18 exhibited slight improvements in reduced friction characteristics. The blend of 2363-80AE/TG-500 is transparent at 30 wt % TG-500 composition, which indicates that the two materials are relatively good miscible. The miscibility is probably due to the similar chemical structure of the soft segments of the materials.

TABLE 4

Surface property of the polymeric blend of 2363-80AE and TG-500.

| Example | Polymer Blend | After compression molding | Contact angle of water (°) - dry |
|---|---|---|---|
| #16 | 2363-80AE (90%)/ TG-500(10%) | Slightly slippery when wet. Transparent. | 81 |
| #17 | 2363-80AE (80%)/ TG-500(20%) | Slightly slippery when wet. Transparent. | 78 |
| #18 | 2363-80AE (67%)/ TG-500(33%) | Slippery when wet. Transparent. | 76 |

OTHER EXAMPLES 19-21

The following examples demonstrate the preparation of a surface of a polymer blend formed by melt blending 2363-55DE and TG-500. 2363-55DE is a hydrophobic polyurethane of the Pellethane® family of polyurethanes, which are derived from a polytetramethylene glycol and manufactured by Lubrizol of Cleveland, Ohio. Prior to blending, all the components are dried in a vacuum oven at 80° C. for at least one hour. The dried 2363-55DE and TG-500 were added to a Brabender mixer at their respective weight ratios (90/10, 80/20, 67/33 (w/w) for samples 19 to 21) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 19 to 21 when dry (i.e., without any hydration/dehydration). The lubricity of the polymer blend sheets (examples 19 to 21) was evaluated when wet, and the opaqueness of the sheets was evaluated visually when the sheets were dehydrated.

Table 5 summarizes the water contact angle of the exemplary polymer blend sheets of 2363-55DE and TG-500 when dry (i.e., without any hydration/dehydration). The results demonstrate that the water contact angle of the polymer blend sheets decreased as the weight percentage of TG-500 increased. The resultant polymeric blend sheets of examples 19, 20 and 21 exhibited minimal reduced friction characteristics.

TABLE 5

Surface property of the polymeric blend of 2363-55DE and TG-500.

| Example | Blends | After compression molding | Contact angle of water (°) - dry |
|---|---|---|---|
| #19 | 2363-55DE (90%)/ TG-500(10%) | No slippery when wet. Transparent. | 89 |
| #20 | 2363-55DE (80%)/ TG-500(20%) | No slippery when wet. Transparent. | 88 |
| #21 | 2363-55DE (67%)/ TG-500(33%) | No slippery when wet. Transparent. | 84 |

OTHER EXAMPLES 22-23

The following examples demonstrate the preparation of a surface of a polymer blend formed by melt blending EG-80A and TG-500. EG-80A is a hydrophobic polyurethane of the Tecoflex® family of polyurethanes, which are derived from a polyether polyol and manufactured by Lubrizol of Cleveland, Ohio. Prior to blending, all the components are dried in a vacuum oven at 80° C. for at least one hour. The dried EG-80A and TG-500 were added to a Brabender mixer at their respective weight ratios (90/10 and 80/20, (w/w) for samples 22 and 23) and mixed at a rotor-speed of 40 rpm for four to six minutes. The temperature of the mixer was 180° C. to 190° C. All blends were cooled to room temperature and cut into small pieces for compression molding into sheets. The compression molding into sheets was performed at 200° C. for four min with 10,000 psi. After molding, each sheet was transferred to a water-cooled press where it was held at 4000 psi until it reached room temperature. The water contact angle was measured for the polymer blend sheets of examples 22 and 23 when dry (i.e., without any hydration/dehydration). The lubricity of the polymer blend sheets (examples 22 to 23) was evaluated when wet, and the opaqueness of the sheets was evaluated visually when the sheets were dehydrated.

Table 6 summarizes the water contact angle of the exemplary polymer blend sheets of EG-80A and TG-500 when dry (i.e., without any hydration/dehydration). The results demonstrate that the water contact angle of the dry polymer blend sheets decreased as the weight percentage of TG-500 increased. The resultant polymeric blend sheets of examples 22 and 23 exhibited minimal reduced friction characteristics.

TABLE 6

Surface property of the polymeric blend of EG-80A and TG-500.

| Example | Polymeric Blends | After compression molding | Contact angle of water (°) |
|---|---|---|---|
| #22 | EG-80A (90%)/ TG-500(10%) | Not slippery when wet. Slightly opaque. | 89 |
| #23 | EG-80A (80%)/ TG-500(20%) | Not slippery when wet. Slightly opaque. | 82 |

The polymeric blend of the present invention incorporates a major hydrophobic polycarbonate polyurethane component and a minor hydrophilic polyurethane component to provide a surface with reduced friction (enhanced lubricity), particularly when wet. The degree of surface lubricity of the polymeric blend can vary depending upon the type and/or amount of the hydrophobic polycarbonate polyurethane component of the blend. For example, a good degree of surface lubricity is provided by polymeric blends of 2363-80AE and TG-500 and also with polymeric blends of PC-3585A and TG-500, and a high degree of surface lubricity is provided by blends of polymeric blends of 3572D and TG-500 provides for a better degree if surface lubricity. The lubricious nature of the polymer blends described herein is useful for a variety of medical devices and non-medical devices.

There have been described and illustrated herein several embodiments of a polymer blend for a reduced friction surface and devices based thereon. While particular embodiments of the invention have been described, it is not intended that the invention be limited thereto, as it is intended that the invention be as broad in scope as the art will allow and that the specification be read likewise. Thus, while particular commercially available hydrophobic and hydrophilic polyurethane polymers have been disclosed, it will be appreciated that other hydrophobic and hydrophilic polyurethane polymers can be used as well. In addition, while use of the polymer blend has been disclosed for surfaces of particular medical devices and non-medical devices, it will be understood that the polymer blend is suitable for other devices. It will therefore be appreciated by those skilled in the art that yet other modifications could be made to the provided invention without deviating from its spirit and scope as claimed.

What is claimed is:

1. A device comprising:
at least one surface formed from a polymer blend including a hydrophobic first polymer component and a hydrophilic second polymer component, wherein the hydrophobic first polymer component is a polycarbonate polyurethane polymer having a water contact angle greater than 75 degrees and the hydrophilic second polymer component is a polyurethane polymer having a water contact angle less than 75 degrees, wherein the weight percentage of the polycarbonate polyurethane polymer of the hydrophobic first polymer component is greater than the weight percentage of the polyurethane polymer of the hydrophilic second polymer component;
wherein the polycarbonate polyurethane polymer of the hydrophobic first polymer component and the polyurethane polymer of the hydrophilic second polymer component are immiscible with respect to one another and are phase separated in the polymer blend and the weight percentage of the polyurethane polymer of the hydrophilic polymer component is at least twenty percent of the polymer blend in order to provide improved lubricity of the surface of the device.

2. A device according to claim 1, wherein:
the polycarbonate polyurethane polymer of the hydrophobic first polymer component has a water contact angle of at least 80 degrees.

3. A device according to claim 1, wherein:
the polyurethane polymer of the hydrophilic second polymer component has a water contact angle in the range of 65 to 75 degrees.

4. A device according to claim 1, wherein:
the polyurethane polymer of the hydrophilic second polymer component is capable of absorbing and retaining an amount of water that is at least 300% of its dry weight.

5. A device according to claim 1, wherein:
the concentration of the polyurethane polymer of the hydrophilic second polymer component in the polymer blend is at least 67 percent by weight.

6. A device according to claim 1, wherein:
the polycarbonate polyurethane polymer of the hydrophobic first polymer component has a Shore hardness greater than 73A.

7. A device according to claim 6, wherein:
the polycarbonate polyurethane polymer of the hydrophobic first polymer component has a Shore hardness between 65D and 90D.

8. A device according to claim 1, wherein:
the relative weight concentration of the polycarbonate polyurethane polymer of the hydrophobic first polymer component to the polyurethane polymer of the hydrophilic second polymer component in the polymer blend is at least 3:1.

9. A device according to claim 1, wherein:
the surface is a portion of a part molded from the polymer blend.

10. A device according to claim 1, wherein:
the surface is a coating of the polymer blend that is applied to a portion of the device.

11. A device according to claim 1, wherein:
the device is a medical device.

12. A device according to claim 11, wherein:
the medical device is selected from the group consisting of guidewires, catheters, endoscopic devices, laparoscopic device, stents or stent-associated devices, embolic protection devices, sutures, devices for inserting implants into the body, trocars, trocar valves, ports for laparoscopic surgery, ear tubes, speculum, condoms, intrauterine devices, contraceptive diaphragms, and joint articulating surfaces.

13. A device according to claim 1, wherein:
the device is a non-medical device.

14. A device according to claim 13, wherein:
the non-medical device is selected from water slides, water skis, boat hulls, surf boards, flippers, a windshield, and clothing.

15. A method of fabricating a device comprising:
coating or forming a surface of at least a portion of the device from a polymer blend including a hydrophobic first polymer component and a hydrophilic second polymer component, wherein the hydrophobic first polymer component is a polycarbonate polyurethane having a water contact greater than 75 degrees and the hydrophilic second polymer component is a polyurethane polymer having a water contact angle less than 75 degrees, wherein the weight percentage of the polycarbonate polyurethane polymer of the hydrophobic first polymer component is greater than the weight percentage of the polyurethane polymer of the hydrophilic second polymer component in the polymer blend;
wherein the polycarbonate polyurethane polymer of the hydrophobic first polymer component and the polyurethane polymer of the hydrophilic second polymer component are immiscible with respect to one another and are phase separated in the polymer blend and the weight percentage of the polyurethane polymer of the hydrophilic polymer component is at least twenty percent of the polymer blend in order to provide improved lubricity of the surface of the device.

16. A method according to claim 15, further comprising:
subjecting the surface to a hydration and dehydration process that enhances the lubricity of the surface and lowers the water contact angle of the surface of the device.

17. A method according to claim 15, wherein:
phase separation of the polycarbonate polyurethane polymer of the hydrophobic first polymer component and the polyurethane polymer of the hydrophilic second polymer component in the polymer blend allows the polyurethane polymer of the hydrophilic second polymer component to migrate to the surface of the device.

18. A device according to claim 1, wherein:
the weight percentage of the polyurethane polymer of the hydrophilic second polyurethane component is twenty percent of the polymer blend.

19. A device according to claim 1, wherein:
the weight percentage of the polyurethane polymer of the hydrophilic second polyurethane component is thirty-three percent of the polymer blend.

20. A device according to claim 1, wherein:
the polyurethane polymer of the hydrophilic second polymer component resides at the surface of the device.

21. A device according to claim 1, wherein:
the polycarbonate polyurethane polymer of the hydrophobic first polymer component comprises at least one functional group consisting of an isocyanate group, a carbonate ester group, a terminal hydroxyl group, a terminal amine group, a urethane linkage, and a urea linkage.

22. A device according to claim 1, wherein:
the polycarbonate polyurethane polymer of the hydrophobic first polymer component is a polymer polymerized from a polycarbonate polyol.

23. A device according to claim 22, wherein:
the polycarbonate polyol is a reaction product of at least two compounds selected from the groups consisting of 1,6-hexanediol with ethylene carbonate, 1,4-butanediol with propylene carbonate, 1,5-pentanediol with ethylene carbonate, cyclohexanedimethanol with ethylene carbonate, and mixtures thereof.

24. A device according to claim 1, wherein:
the polyurethane polymer of the hydrophilic second polymer component comprises at least one functional group consisting of an isocyanate group, a terminal hydroxyl group, a terminal amine group, a urethane linkage, and a urea linkage.

25. A device according to claim 1, wherein:
the polyurethane polymer of the hydrophilic second polymer component is polymerized from a polyol selected from the group consisting of a polyester polyol, a polyether polyol, and an amine-terminated polyol.

* * * * *